(12) United States Patent
Abubakar et al.

(10) Patent No.: US 7,640,110 B2
(45) Date of Patent: Dec. 29, 2009

(54) PIXEL BASED INVERSION METHOD FOR SURFACE ELECTROMAGNETIC MEASUREMENT

(75) Inventors: Aria Abubakar, North Reading, MA (US); Tarek M. Habashy, Burlington, MA (US); Vladimir Druskin, Brookline, MA (US); David Lee Alumbaugh, Berkeley, CA (US)

(73) Assignee: Schlumberger Technology Corporation, Cambridge, MA (US)

( * ) Notice: Subject to any disclaimer, the term of this patent is extended or adjusted under 35 U.S.C. 154(b) by 0 days.

(21) Appl. No.: 11/741,234

(22) Filed: Apr. 27, 2007

(65) Prior Publication Data

US 2008/0270028 A1    Oct. 30, 2008

(51) Int. Cl.
G01V 3/38 (2006.01)
G01V 3/08 (2006.01)

(52) U.S. Cl. .............. 702/2; 702/6; 702/7; 702/11; 702/13; 367/75; 324/323; 324/324; 324/325; 324/326; 324/327; 324/328; 324/329; 324/330; 324/331; 324/332; 324/333; 324/334; 324/365; 324/366; 324/375

(58) Field of Classification Search ............. 702/2, 702/6, 7, 11, 13; 324/323–375; 367/75
See application file for complete search history.

(56) References Cited

U.S. PATENT DOCUMENTS

| 6,388,947 | B1* | 5/2002 | Washbourne et al. ......... 367/73 |
| 6,628,119 | B1 | 9/2003 | Eidesmo et al. |
| 6,879,735 | B1 | 4/2005 | Portniaguine et al. |
| 7,038,456 | B2 | 5/2006 | Ellingsrud et al. |
| 2004/0124842 | A1* | 7/2004 | Eidesmo et al. ............. 324/337 |
| 2005/0077902 | A1* | 4/2005 | MacGregor et al. ......... 324/334 |
| 2007/0127315 | A1* | 6/2007 | Tompkins .................... 367/75 |

OTHER PUBLICATIONS

Davydycheva et al., An efficient finite-difference scheme for electromagnetic logging in 3D anisotropic inhomogenous media, Geophysics, Vo. 68, No. 5, 2003, pp. 1525-1536.
Alumbaugh et al., Fast Two-Dimensional Forward and Inversion Alogrithnns for Interpreting Marine CSEM Data, OTC OTC-18154-PP, Houston, TX, USA, May 1-4, 2006, pp. 2-11.
Johansen et al., Subsurface hydrocarbons detected by electromagnetic sounding, First Break, vol. 23, 2005, pp. 31-36.
Abubakar et al., Two-and Half-Dimensional Forward and Inverse Modeling for Marine CSEM Problems, SEG/New Orleans Annual Meeting, 2006, pp. 750-754.

(Continued)

Primary Examiner—Tung S Lau
Assistant Examiner—Sujoy K Kundu
(74) Attorney, Agent, or Firm—Helene Raybaud; James McAleenan; Jody DeStefanis (57) ABSTRACT

A method of determining the nature of a submarine or subterranean reservoir having an electromagnetic characteristic is described. The method comprises analyzing data associated with the application of a time varying electromagnetic field from above the reservoir using a data analysis methodology that does not utilize an estimate of the reservoir's geometry in determining one or more characteristics of the reservoir.

20 Claims, 5 Drawing Sheets

OTHER PUBLICATIONS

Eidesmo et al., Sea Bed Logging, a new method for remote and direct identification of hydrocarbon filled layers in deepwater areas, First Break, vol. 20, 2002, pp. 144-152.

Newman et al., Three-dimensional massively parallel electromagnetic inversion-I. Theory, Geophys.J.Int., vol. 128, 1997, pp. 345-354.

Farquharson et al., Non-linear inversion using general measures of data misfit and model structure, Geophys. J. Int., vol. 134, 1998, pp. 213-227.

Abubakar et al., An integral equation approach for 2.5 -dimensional forward and inverse electromagnetic scattering, Geophys. J. Int., vol. 165, 2006, pp. 744-762.

MacGregor et al., Use of marine controlled-source electromagnetic sounding for sub-basalt exploration, Geophysical Prospecting, vol. 48, 2000, pp. 1091-1106.

Rodi et al., Nonlinear conjugate gradients algorithm for 2-D magnetotelluric inversion, Geophysics, vol. 66, No. 1, 2001, pp. 174-187.

Charbonnier et al., Deterministic Edge-Preserving Regularization in Computed Imaging, IEEE Transactions on Image Processing, vol. 6, No. 2, 1997, pp. 298-311.

Van Den Berg et al., Extended contrast source inversion, Inverse Problems, vol. 15, 1999, pp. 1325-1344.

McGillivray et al., Methods for Calculating Frechet Derivatives and Sensitivities for the Non-Linear Inverse Problem: A Comparative Study, Geophysical Prospecting, vol. 38, 1990, pp. 499-524.

Mittet et al., A two-step approach to depth migration of low frequency electromagnetic data., 75th Annual International Meeting, SEG, Expanded Abstracts, 2005, pp. 522-525.

Rudin et al., Nonlinear total variation based noise removal algorithms, Physica D, vol. 60, 1992, pp. 259-268.

Habashy et al., A General Framework for Constraint Minimization for the Inversion of Electromagnetic Measurements, Progress in Electromagnetics Research, PIER 46, 2004, pp. 265-312.

Vogel et al., Iterative Methods for Total Variation Denoising, SIAM Journal on Scientific Computing, vol. 17, No. 1, 1996, pp. 227-238.

Tompkins, Marine controlled-source electromagnetic imaging for hydrocarbon exploration: interpreting subsurface electrical properties, First Break, vol. 22, 2004, pp. 45-51.

Dennis et al., Numerical Methods for Unconstrained Optimization and Nonlinear Equations, Prentice Hall, Inc., New Jersey, 1983, Chapter 5.

Abubakar et al., A fast and rigorous 2.5D inversion alogrithm for cross-well electromagnetic data, 75th Annual International Meeting, SEG, Expanded Abstracts, 2005, pp. 534-537.

Ingerman et al., Optimal Finite Difference Grids and Rational Approximations of the Square Root I. Elliptic Problems, Communications on Pure and Applied Mathematics, vol. LIII, 2000, pp. 1039-1066.

Yee Numerical Solution of Initial Boundary Value Problems Involving Maxwell's Equations in Isotropic Media, IEEE Transactions on Antennas and Propagation, vol. 14, No. 3, 1966, pp. 302-307.

Alumbaugh et al. Two-Dimensional Inversion of Marine Electromagnetic Data Using Seismic Reflection Data as Apriori Information, AGU Fall Meeting, Dec. 11-15, 2006, San Francisco, California, USA, Abstract.

van den Berg et al., Contrast Source Inversion Method: State of Art, Progress in Electromagnetics Research, PIER 34, 189-218, 2001.

\* cited by examiner

PIXEL BASED INVERSION METHOD FOR SURFACE ELECTROMAGNETIC MEASUREMENT

FIELD OF THE INVENTION

The invention relates in general to electromagnetic imaging surveys used for characterizing hydrocarbon reservoirs and ground water aquifers.

BACKGROUND OF THE INVENTION

Marine Controlled Source Electromagnetic (CSEM) methods have recently received increased attention as a hydrocarbon exploration tool; see for example MacGregor and Sinha (2000), Eidesmo et al.(2002) and Johansen et al (2005). The interest has resulted from the technique's ability to directly detect the presence of thin hydrocarbon bearing layers. Initially, the data were analyzed by plotting the electric field amplitude versus source-receiver offset, and then by normalizing the data that were acquired over a possible hydrocarbon prospect by data measured over a similar non-hydrocarbon bearing area (Eidesmo et al., 2002). Because the presence of hydrocarbon increases the amplitude of the measured electric field, the normalized value will be greater than unity for areas containing resistive anomalies, and unity or less for non-hydrocarbon bearing zones. Although this method will provide information on the presence of hydrocarbon, as well as some information about the horizontal location and extent of the reservoir, it is difficult to discern its depth and its true geometry.

Another method requires making an assumption regarding the location and geometry of the reservoir. This assumption incorporates a risk that if the assumption is wrong that it will create a bias in the result such as some of the time indicating the absence of hydrocarbons when hydrocarbons are actually present and some of the time indicating that hydrocarbons are present when they are actually absent. This bias can be eliminated by employing an inversion approach as characterized in the present application.

To provide this additional information, one will need to employ an inversion approach. For producing approximate images of subsurface conductivity structure, one can employ fast imaging techniques such as the migration wave-field imaging approaches, e.g. Tompkins (2004) and Mittet, et al. (2005). These approaches generally provide low-resolution images that can be difficult to interpret in terms of true conductivity structure. Other approaches involve rigorous inversion algorithms such as the schemes employed in Newman and Alumbaugh (1997) and MacGregor and Sinha (2000). This tends to be computationally expensive due to the employed forward modeling schemes that rely on iterative matrix solution techniques. These methods generally require each source excitation to be solved for one at a time. Consequently, a 2.5D inversion may take hours to days on a standard serial computer, while the 3D inversion can only be tractable using massively parallel resources.

In the present application, a fast rigorous 2.5D forward and inversion algorithms for the interpretation of marine CSEM data is described. The forward scheme provides for simultaneous solution of all source-receiver configurations in a matter of minutes rather than hours. This in turn allows for rapid inversion algorithms.

SUMMARY OF THE INVENTION

In general, a method is disclosed. The method comprises analyzing data associated with the application of a time varying electromagnetic field from above a reservoir using a data analysis methodology that does not utilize an estimate of the reservoir's geometry in determining one or more characteristics of the reservoir. In another aspect, the method may also comprise selecting a grid type, defining a starting model for inversion, applying an inversion approach to surface electromagnetic survey data to obtain the conductivity value at each grid node, displaying the conductivity value at the grid nodes to obtain a conductivity image, and verifying that the image is geologically reasonable. In another aspect, the method may also comprise reiterating the data analysis methodology when the conductivity image is not geologically reasonable. In another aspect, the grid type is an equidistant grid such that the size of cells in the grid is determined by the resolution of the measurement. In another aspect, the grid type is an adaptive grid such that the size of cells in the grid is determined by the data sensitivity within each inversion cell. In another aspect, the inversion approach is a local optimization type approach. In another aspect, the local optimization type approach is selected from the group comprising a steepest descent approach, a non-linear conjugate gradient approach, a gauss Newton approach, a quasi-Newton approach and a full Newton approach. In another aspect, the inversion approach is a global optimization type approach. In another aspect, the global optimization type approach is selected from the group comprising the Bayesian approach, the Monte Carlo approach, the genetic algorithm approach, the simulated annealing approach and the particle swarm approach.

Further features and advantages of the invention will become more readily apparent from the following detailed description when taken in conjunction with the accompanying drawings.

DETAILED DESCRIPTION

Figure 1:
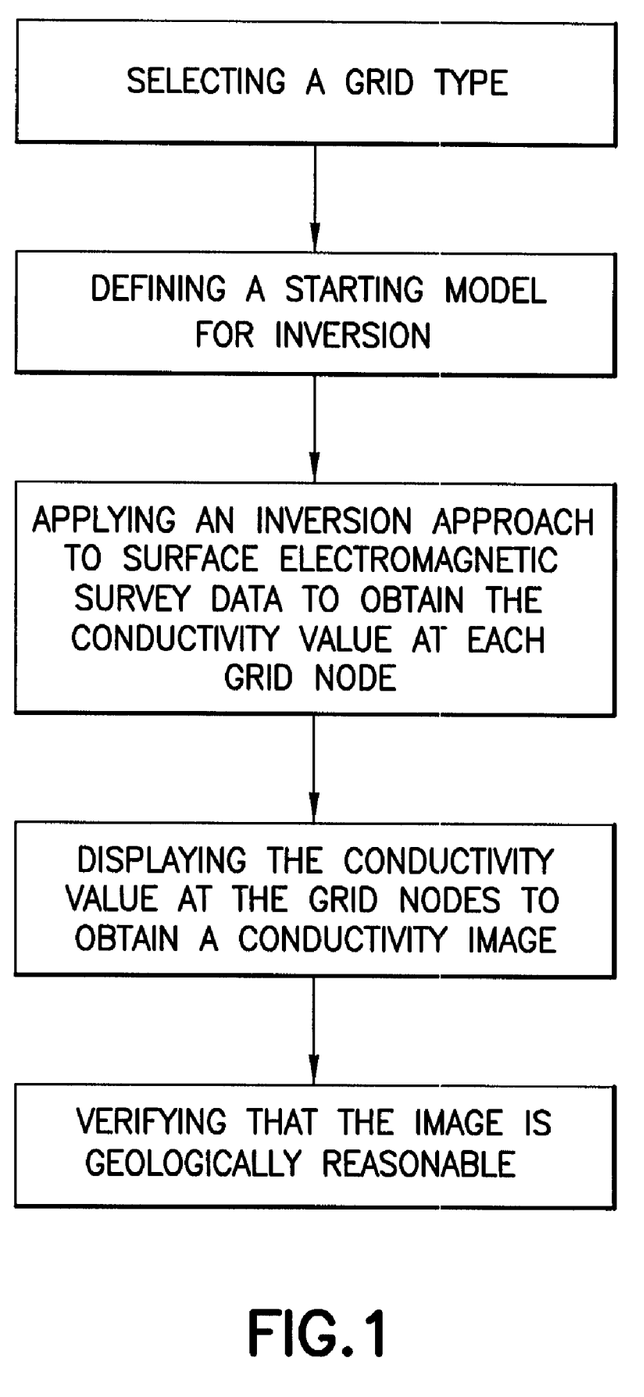
In FIG. 1, a method is disclosed.

Turning to FIG. 1 the data analysis methodology is described. In act 2, a grid type selected. In act 4, a starting model for the inversion is defined. In act 6, the inversion approach is applied to surface electromagnetic survey data to obtain the conductivity value at each grid node. In act 8, a forward approach is used to drive the inversion approach to simulate the data. In act 10, the conductivity value at the grid nodes is displayed to obtain a conductivity image. In act 12, the image is verified for geological reasonableness. In act 14, if the image is not geologically reasonable, the methodology is reiterated.

Turning to act 2, either an equidistant grid or an adaptive grid is selected. An equidistant grid may be selected such that the size of cells in the grid is determined by the resolution of the measurement or an adaptive grid may be selected such that the size of cells in the grid is determined by the data sensitivity within each inversion cell.

Turning to act 4, a starting model is selected that accommodates any known a priori information, e.g. from geology.

Turning to act 6, the inversion approach is applied to surface electromagnetic survey data to obtain the conductivity value at each grid node. At the n-th iteration, the inversion attempts to find a conductivity model n m that minimizes the following cost function:

$$\Phi(\overline{m}_n) = \phi^d(\overline{m}_n) + \phi^m(\overline{m}_n) \qquad (5)$$

The first term on the right hand side of (5) is the data misfit cost function which is given as follows:

$$\phi^d(\overline{m}_n) = \frac{\left\| \overline{W}_d \cdot [\overline{d}^{obs} - \overline{d}^{pred}(\overline{m}_n)] \right\|^2}{\left\| \overline{W}_d \cdot \overline{d}^{obs} \right\|^2}, \qquad (6)$$

where $\|\cdot\|$ denotes the $L_2$-norm of a vector. Here $\overline{d}^{obs}$ is a vector of the measured data, $\overline{d}^{pred}(\overline{m}_n)$ is a vector containing the predicted data calculated for the model $\overline{m}_n$ by the forward simulator, and $\overline{W}_d$ is a data weighting matrix. The second term on the right hand side of (5) is the regularization term that helps to stabilize the inversion process. Applying a minimum-model-variation constraint of the form $$\Phi^m(\overline{m}_n) = \lambda_n [\|\overline{B}_n \overline{W}_m \cdot (\overline{m}_n - \overline{m}_{ref})\|^2 + \delta_n^2 \|\overline{B}_n \cdot \overline{I}\|^2] \qquad (7)$$

where $\overline{I}$ is a unit vector, $\overline{m}_{ref}$ is a reference model. The $\overline{W}_m$ matrix is the discretized form of the spatial gradient operator, $\overline{B}_n$ is a diagonal weighting matrix that determines the nature of the spatial variation in the model as described below, and $\lambda_n$ is the trade off parameter that is adjusted during the inversion process to judicially emphasize the data fit term, the regularization term, or attempt to give both equal weight.

As mentioned, the $\overline{B}_n$ a matrix is a model-constraint weighting term that is determined by the type of expected model. To produce a model that is smoothly varying from one location to the next, the weights are chosen to be constant across the image domain, and have the form $$B_{n;ii}^2 = \frac{\Delta x_i \Delta z_i}{\sum\limits_{k=1}^{K} \Delta x_k \Delta z_k \left[ \left\| \sum\limits_{l=1}^{K} W_{m;kl}(m_{n;l} - m_{ref;l}) \right\|^2 + \delta_n^2 \right]}, ; \qquad (8)$$

where $\Delta x$ and $\Delta z$ are the cell sizes within the inversion domain in the x- and z-direction, respectively, and $\delta_n^2$ a small number that is used to avoid singularities during the early iterations. Superficially calculating this constant at each iteration as $$\delta_n^2 = \phi^d(\overline{m}_n)/(\Delta x \Delta z). \qquad (9)$$

To produce a model that is blocky in nature, a 'weighted-$L_2$ norm' cost function is used, in which the weights are given as $$B_{n;ii}^2 = \frac{\Delta x_i \Delta z_i}{A \left[ \left\| \sum\limits_{l=1}^{K} W_{m;il}(m_{n;l} - m_{ref;l}) \right\|^2 + \delta_n^2 \right]}, \qquad (10)$$

where A is the area of the inversion domain. When this weighting scheme is applied within the regularization term of the cost function, the inversion scheme will try to minimize the number of locations in the model domain that exhibit small gradients between adjacent parameters, thus resulting in a blocky model with sharp discontinuities.

To find a model that minimizes the cost function in (5), first linearize about the current model by taking the derivative of this expression with respect to the current model and setting the resulting expression to zero. This results in an expression that has the general form $$\overline{H} \cdot \overline{p} \cdot = -\overline{g} \cdot. \qquad (11)$$

where $$\overline{H} \cdot = \overline{J} \cdot^T \cdot \overline{W}_d^T \cdot \overline{W}_d \overline{J} \cdot + \lambda \overline{W}_m^T \cdot \overline{B} \cdot \overline{W}_m \qquad (12)$$

$$\overline{g} \cdot = \overline{J} \cdot^T \cdot \overline{W}_d^T \cdot \overline{W}_d \cdot [\overline{d} \cdot - \overline{d} \cdot (\overline{m} \cdot)] \qquad (13)$$

$$+ \lambda \cdot \overline{W} \cdot^T \cdot \overline{B} \cdot^T \cdot \overline{B} \cdot \overline{W} \cdot (\overline{m} \cdot - \overline{m}_{ref})$$

In (11) the symbol $p\bullet$ denotes the Gauss-Newton step. The Jacobian matrix $J\bullet$ is given by $$J_{n;ij} = \frac{1}{\|W_d \cdot d^{obs}\|} \frac{\partial d_{n;i}^{pred}}{\partial m_{n;j}}. \qquad (14)$$

Using (2) and (3), the Jacobian can be written as $$\frac{\partial d_{n;i}^{pred}}{\partial m_{n;j}} = r_{rec;i}^T \cdot \overline{F}_n^{-1} \cdot \left[ \frac{\partial \overline{F}_n}{\partial m_{n;j}} \right] \cdot \overline{e}_{n;i}, \qquad (15)$$

where $\overline{e}\bullet$ is the electric field vector corresponding to the source generating the i-th data. Denoting the remainder of the right hand side as $$\overline{v} \cdot = \overline{r} \cdot \overline{F} \qquad (16)$$

realizing that this is simply a second forward solution with a source vector equal to $\overline{r} \cdot^2$ or the vector that interpolates the electric fields from the staggered grid to the receiver position. Thus calculation of the Jacobian involves one set of forward solutions for the sources, and another set for all the receiver interpolation vectors. This is known as the 'Adjoint Solution'. However, because all forward solutions are essentially free once $\overline{F}\bullet$ is solved the additional field values needed for the Jacobian are calculated at the same time when calculating the predicted data. This greatly enhances the speed of the inversion algorithm.

Since the size of the Hessian matrix in (11) is large, the linear set of equations is solved using an iterative method. In particular, the equations are solved by employing a Conjugate Gradient Least Squares algorithm. Further by employing a backtracking scheme to ensure that the cost-function in (5) is reduced at each iteration. To ensure that the parameters lie within physically reasonable conductivity bounds, also by applying a non-linear transform to the data. Finally, the tradeoff parameter is adjusted at each iteration based on the data misfit. The iterative scheme of calculating the forward solutions and minimizing the cost function proceeds until one of four conditions is met: (1) the data misfit reaches a predetermined tolerance level; 2) The difference between the data misfit at two successive iterates is within a predetermined small number; 3) The difference between the model parameters at two successive iterates is within a predetermined small number; 4) the total number of iterates exceeds a prescribed maximum.

Turning to act 8, a forward approach is used to drive the inversion approach to simulate the data. The forward algorithm uses a frequency-domain, finite difference staggered grid. Assuming a exp(-iωt) time dependence where ω is the radial frequency, t is time, and i=−1, the electric field E satisfies the following differential equation:

$$\nabla \times \nabla \times \overline{E} - (\omega^2 \mu \epsilon + i\omega \mu \sigma)\overline{E} = i\omega \mu \overline{J}. \quad (1)$$

Here μ, ε and σ represent the magnetic permeability, dielectric permittivity, and electrical conductivity, respectively, and $\overline{J}$ is the vector moment of the electric dipole source. This equation is discretized using staggered grid formulation with the electric fields located along the edges of discretization cells, and the magnetic fields at the center of the discretization cell faces. Equation (1) can also be written as follows:

$$\overline{F}(\sigma, \omega) \cdot \overline{e} = \overline{s}, \quad (2)$$

where $\overline{F}$ is the stiffness matrix, $\overline{e}$ is the vector of discretized electric field values and $\overline{s}$ is the source vector.

To rapidly solve this system of equations and to provide accurate solutions, the inner computational domain is discretized using a uniform grid. The boundaries are then extended away from this uniform region in the x and z directions with as few cells as possible using the optimal grid technique. This technique is also used to choose the spatial frequency components along the y-direction that are needed in the computation. Furthermore, to use the optimal grid without sacrificing accuracy, an anisotropic material averaging formula is employed to upscale from the model parameters that can be very finely discretized, to the computational grid that is as coarse as possible while maintaining an accurate solution. The resulting matrix system is then solved using a direct matrix inversion technique to obtain the solution for all source excitations simultaneously. This last feature greatly aids in providing a fast solution for the inverse problem where the solution for many source locations and orientations are required by inverting the stiffness matrix only once. This also provides for very accurate solutions as round-off errors and 'spurious modes' associated with the use of iterative matrix inversion techniques are avoided. However, because the frequency information is contained in the stiffness matrix, each new frequency will require an additional forward problem to be solved. Thus the total run time is dependent on the number of cells in the model times the number of frequencies to be simulated.

The use of the staggered grid requires that the fields be located at a priori defined locations which may not necessarily correspond to the exact source and receiver positions. To allow for this a simple interpolation is performed from the source point to the staggered gridfield locations to provide for the source vector, and reverse the process for the receivers, that is interpolate from the staggered grid to the receiver location. Numerically, the latter can be represented as $$d^{pred} = \overline{r}_{rec}^T \cdot \overline{e}^*, \quad (3)$$

where $\overline{r}_{rec}^T$ is an interpolation vector where the sum of all elements is equal to unity.

Figure 2:
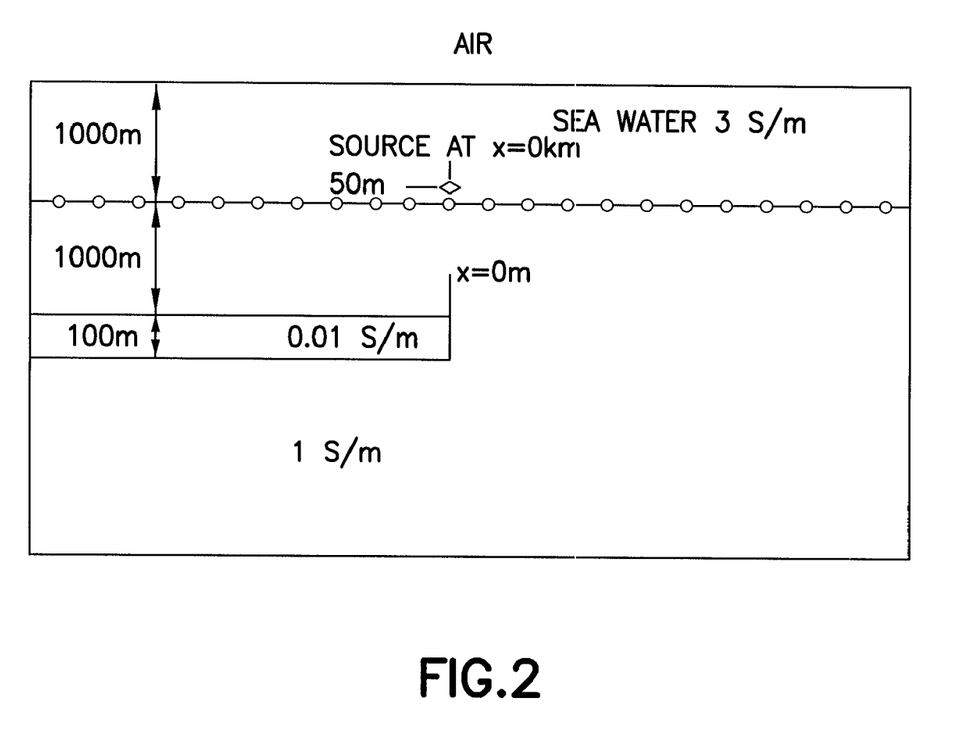
In FIG. 2 a half slab is shown.

Turning to act 12, the image is verified for geological reasonableness. In FIG. 2, a half slab is shown. The forward algorithm has been compared extensively to 2D model results generated by 3D algorithms. Here computations generated by the 2.5D forward algorithm to results from Newman and Alumbaugh (1997) are compared. Thus on the right-hand side of the model the results will converge to a 1D solution, while on the left hand side it will converge to the solution with the body present. The frequency is 0.635 Hz, and a grid of 324 cells in x direction and 61 in z was employed within the 2.5D algorithm. The solution time for the 2.5D algorithm was approximately 5 minutes on a PC with 3.2 GHz processor. For comparison, the 3D code took 2 hours and 15 minutes.

Figure 3:
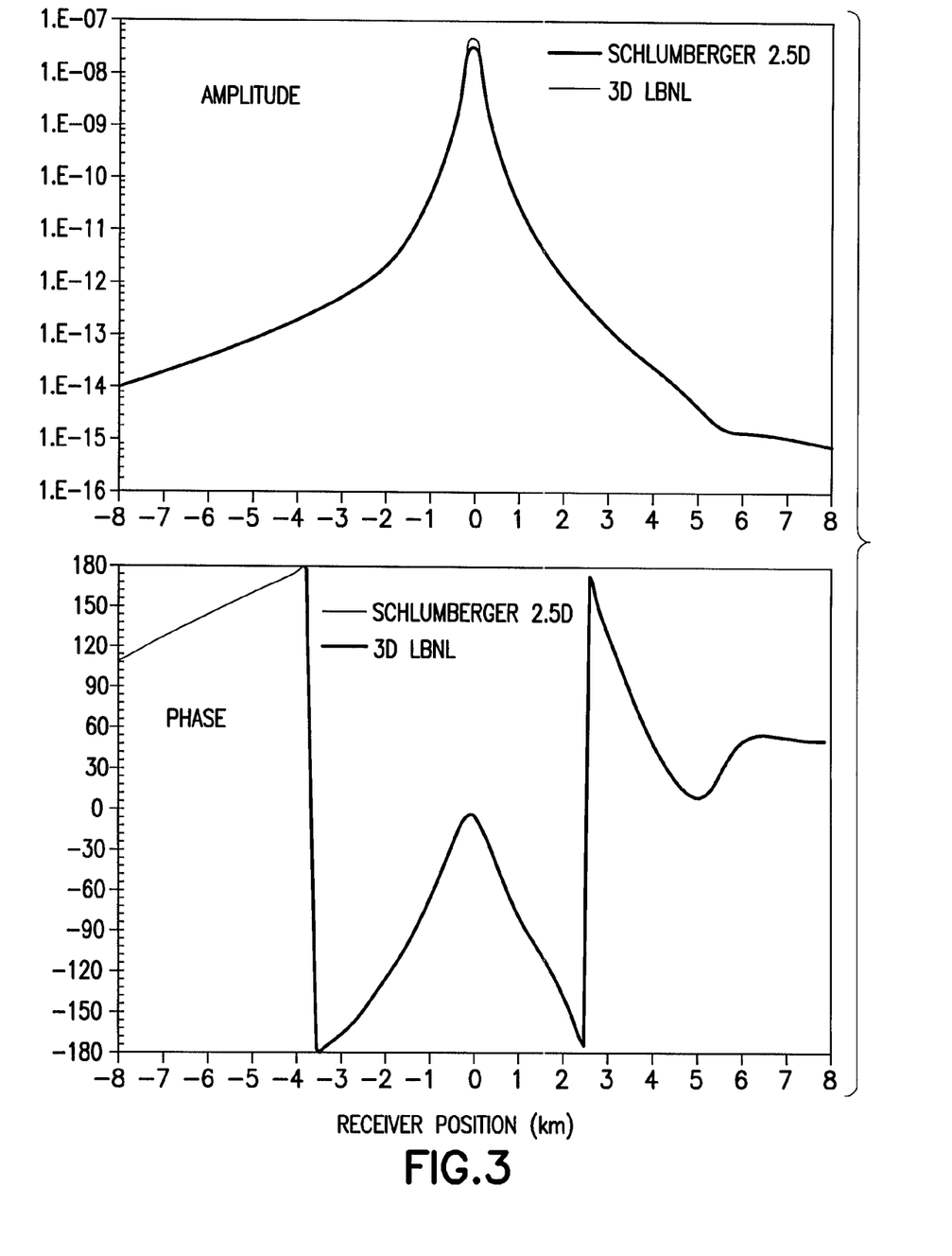
FIG. 3 the electric field in the x-direction (Ex) amplitude (top) and phase (bottom) is shown.

FIG. 3 illustrates a comparison of the horizontal component of the inline electric field (the source is an electric dipole along the x-direction and the electric field is measured along the x-direction) amplitude and phase. This excellent agreement provides confidence that both solutions are operating properly for this particular model.

Figure 4:
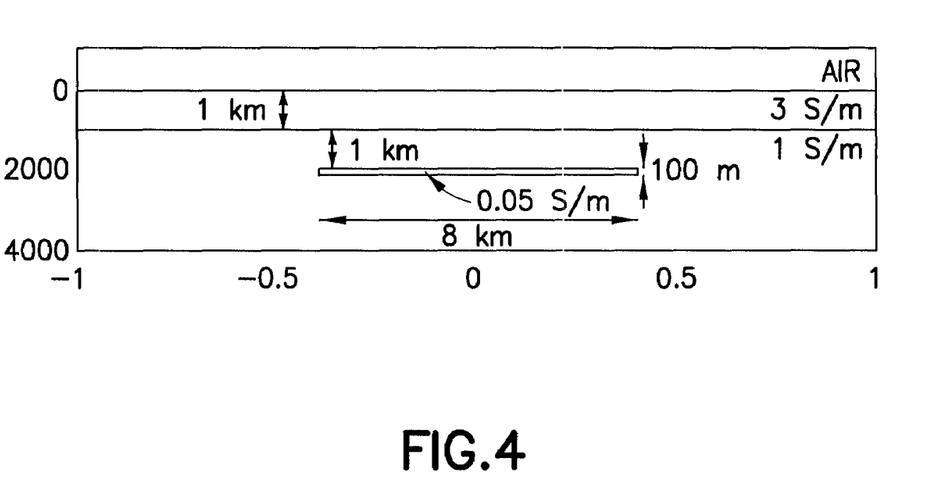
FIG. 4 illustrates a 2D model employed to demonstrate the inversion algorithm.

In FIG. 4, the performance of the inversion algorithm employed is demonstrated. The model consists of an 8 km wide, 100 m thick reservoir located at 1 km depth in a half-space medium. The frequency of operation is 0.25 Hz, and the data were calculated for 21 sea-bottom receivers spaced at 1 km intervals using 41 sources spaced at 500 m intervals. The same 2.5D simulator employed in the inversion scheme was employed to generate the synthetic data set, except that a finer grid (100 m by 25 m) was employed in this process compared to the grid employed for the inversion (200 m by 50 m). Thus in the generation of data 131×91 cells are used and in the inversion 104×42 cells are used. To simulate the instrument noise that is present in real data, random noise with a standard deviation of 1e-15 V/m and 1e-13 A/m were added to the synthetic data.

Figure 5:
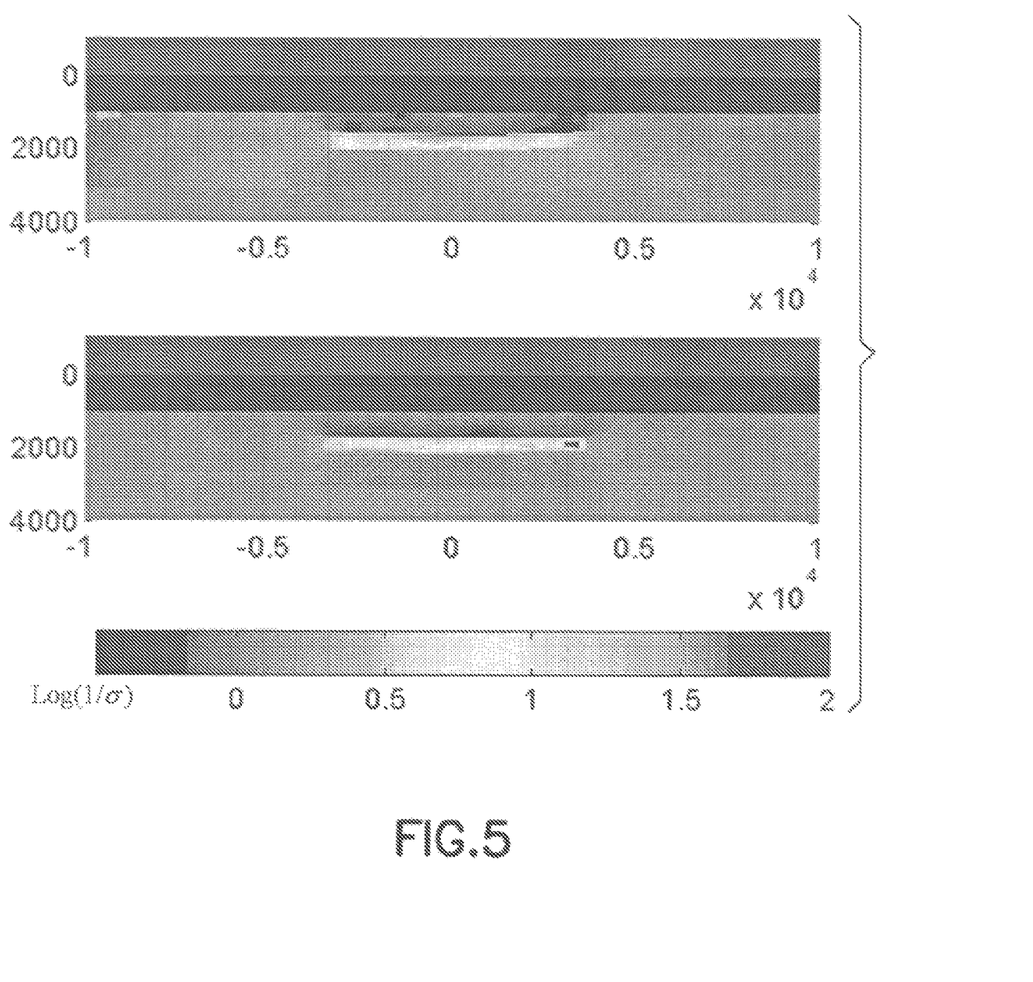
FIG. 5 illustrates the inversion results from inverting Ex-Ex data (Ex source and Ex receiver) (top plot); and Ex-Ex, Ex-Ez, Ex-Hy, Ey-Ey and Ey-Hx data (bottom plot).

The image resulting from inverting the Ex-Ex data is shown in the top plot of FIG. 5. Displayed the result using the weighted 2 L-norm. The computational time was approximately 4 minutes per iteration on a PC with a 3.2 GHz Pentium processor. The bottom plot in FIG. 5 shows the inversion results when both the inline (Ex-Ex, Ex-Ez and Ex-Hy) and crossline (Ey-Ey and Ey-Hx) data are employed. Note that to simulate realistic conditions, the cross-line data were calculated for only 11 sources spaced 2 km apart. These plots show that as different types of data are added, the reservoir is better resolved.

Turning to act 14, if the image is not geologically reasonable, the methodology is reiterated.

The invention has been described with reference to particular preferred embodiments, but variations within the spirit and scope of the invention will occur to those skilled in the art.

The invention claimed is:

1. A method of determining the nature of a submarine or subterranean reservoir having an electromagnetic characteristic comprising:
   collecting surface electromagnetic survey data from the subterranean reservoir;
   applying a non-linear inversion approach to the surface electromagnetic survey data to reconstruct a quantitative distribution of the conductivity of the subterranean reservoir, wherein the iterations of the non-linear iterative inversion attempt to find a conductivity model that minimizes a cost function accounting for the surface electromagnetic survey data misfit and comprising an inversion stabilization variable;
   using a forward model to drive the non-linear iterative inversion approach to simulate the surface electromagnetic survey data; and
   displaying results as a spatial pixel distribution of the conductivity of the subterranean reservoir.

2. The method of claim 1 further comprising:
   selecting a grid type;
   defining a starting model for the non-linear iterative inversion approach;
   displaying the spatial pixel distribution of the conductivity using the conductivity value at the grid nodes; and verifying that the spatial pixel distribution of the conductivity is geologically reasonable.

3. The method of claim 2 further comprising reiterating the data analysis methodology when the spatial pixel distribution of the conductivity is not geologically reasonable.

4. The method of claim 3 wherein the grid type is an equidistant grid such that the size of cells in the grid is determined by the resolution of the measurement.

5. The method of claim 3 wherein the grid type is an adaptive grid such that the size of cells in the grid is determined by the data sensitivity within each inversion cell.

6. The method of claim 3 wherein the non-linear iterative inversion approach is a local optimization type approach.

7. The method of claim 6 wherein the local optimization type approach is selected from the group comprising a steepest descent approach, a non-linear conjugate gradient approach, a gauss Newton approach, a quasi-Newton approach and a full Newton approach.

8. The method of claim 3 wherein the non-linear iterative inversion approach is a global optimization type approach.

9. The method of claim 8 wherein the global optimization type approach is selected from the group comprising the Bayesian approach, the Monte Carlo approach, the genetic algorithm approach, the simulated annealing approach and the particle swarm approach.

10. The method of claim 1 wherein the spatial pixel distribution of the conductivity reveals the presence of hydrocarbon.

11. The method of claim 1 wherein the spatial pixel distribution of the conductivity reveals the horizontal location.

12. The method of claim 1 wherein the spatial pixel distribution of the conductivity reveals the extent of the reservoir.

13. The method of claim 1 wherein the spatial pixel distribution of the conductivity reveals the depth the reservoir.

14. The method of claim 1 wherein the spatial pixel distribution of the conductivity reveals the true geometry of the reservoir.

15. A method of determining the nature of a submarine or subterranean reservoir having an electromagnetic characteristic comprising:
analyzing electromagnetic data associated with the application of a time varying electromagnetic field from above the reservoir using a data analysis methodology to determine one or more characteristics of the reservoir, said data analysis methodology determining said one or more characteristics of the reservoir applying a non-linear iterative inversion approach to the electromagnetic data to reconstruct a quantitative distribution of the conductivity of the subterranean reservoir, wherein the iterations of the non-linear iterative inversion approach attempt to find a conductivity model that minimizes a cost function accounting for the surface electromagnetic survey data misfit and comprising an inversion stabilization variable; and
displaying the result of the data analysis as pixels in a spatial pixel distribution of the conductivity of the reservoir.

16. The method of claim 1, wherein the cost function is given by:

$$\Phi(\overline{m}_n)=\phi^d(\overline{m}_n)+\phi^m(\overline{m}_n)$$

wherein the first term on the right hand side of the cost function is the data misfit cost function and the second term on the right hand side of the cost function is the inversion stabilization variable.

17. The method of claim 16, wherein the data misfit cost function is given by:

$$\phi^d(\overline{m}_n) = \frac{\left\|\overline{W}_d \cdot [\overline{d}^{obs} - \overline{d}^{pred}(\overline{m}_n)]\right\|^2}{\left\|\overline{W}_d \cdot \overline{d}^{obs}\right\|^2}, \quad (6)$$

where $\|\cdot\|$ denotes the $L_2$-norm of a vector, $\overline{d}^{obs}$ is a vector of the surface electromagnetic survey data, $\overline{d}^{pred}(\overline{m}_n)$ is a vector containing the predicted data calculated for the conductivity model $\overline{m}_n$ by the forward model, and $\overline{W}_d$ is a data weighting matrix.

18. The method of claim 1, wherein the inversion stabilization variable comprises a trade off parameter that is adjusted during the non-linear iterative inversion approach to emphasize the surface electromagnetic survey data misfit, the inversion stabilization variable, or attempt to give both equal weight.

19. The method of claim 18, wherein the inversion stabilization variable is given by:

$$\Phi^m(\overline{m}_n)=\lambda_n[\|\overline{B}_n\overline{W}_m\cdot(\overline{m}_n-\overline{m}_{ref})\|^2+\delta_n^2\|\overline{B}_n\cdot\overline{I}\|^2]$$

where $\overline{I}$ is a unit vector, $\overline{m}_{ref}$ is a reference model, $\overline{W}_m$ matrix is the discretized form of the spatial gradient operator, $\overline{B}_n$ is a diagonal weighting matrix that determines the nature of the spatial variation in the conductivity model, and $\lambda_n$ is the trade off parameter.

20. The method of claim 1 wherein iterations of the non-linear iterative inversion approach proceeds until one of four conditions is met: (1) the surface electromagnetic survey data misfit reaches a predetermined tolerance level; 2) the difference between the surface electromagnetic survey data misfit at two successive iterates is within a predetermined first number; 3) the difference between the conductivity model parameters at two successive iterates is within a predetermined second number; 4) the total number of iterates exceeds a prescribed maximum.

* * * * *